Figure 1B:
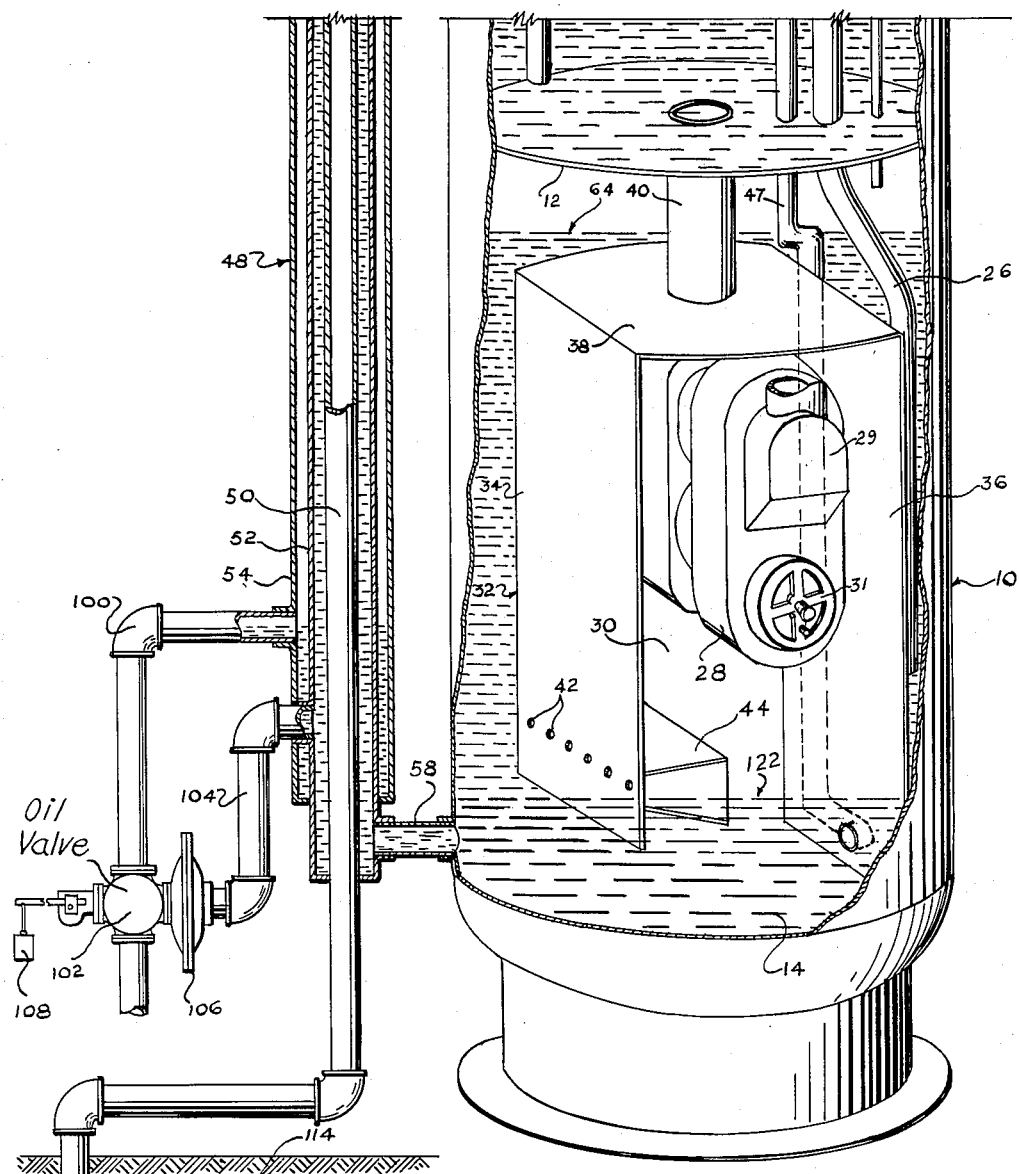

April 3, 1956  E. R. WILLIAMS  2,740,492
EMULSION TREATER HAVING WATER CONTROL SYSTEM
Filed June 8, 1953  2 Sheets-Sheet 1
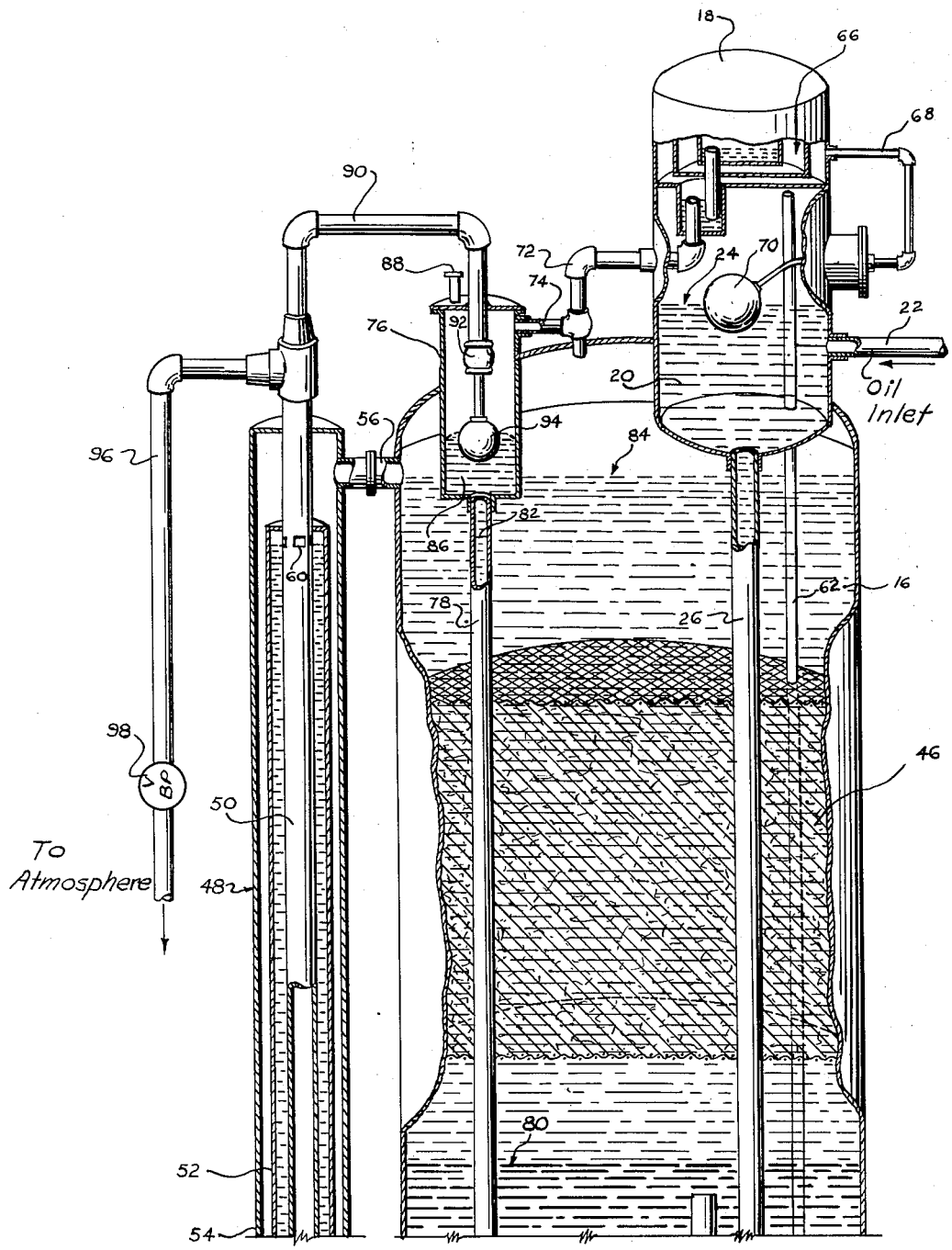
Fig. 1a.
INVENTOR.
Elmer R. Williams
BY
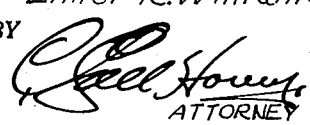
ATTORNEY INVENTOR.
Elmer R. Williams United States Patent Office 2,740,492
Patented Apr. 3, 1956

2,740,492

EMULSION TREATER HAVING WATER CONTROL SYSTEM

Elmer R. Williams, Great Bend, Kans.

Application June 8, 1953, Serial No. 360,390

8 Claims. (Cl. 183—2.7)

This invention relates to improvements in structures for use in the petroleum industry, and particularly to that class of equipment adapted to handle petroleum products containing oil, water and gas.

It is the primary object of this invention to provide structure in the nature of a treater for separating gas, water and oil from petroleum products that is adapted for use, notwithstanding the ratio of water to oil in the products prior to treatment, and capable of efficient operation regardless of changes in such ratio during continuous pumping operations from a natural well.

Heretofore, in the petroleum industry it has been necessary to provide for differing types of treaters, depending upon the nature of the well with which the same were used. If the petroleum products to be treated contained an excessive amount of water, then initial treatment was required to remove the excess water prior to subsequent treating steps wherein additional free water and emulsified water were removed. Manifestly, such problems resulted in added expense to the industry by virtue of the necessity of providing several treaters and other costly equipment.

It is accordingly the most important object hereof to provide a treater operable automatically to increase or decrease the rate of water flow therefrom through the water siphoning system in direct response to changes in the ratio of water to oil in the incoming petroleum products.

Another important object hereof is to provide a treater as above set forth having structure adapted for utilizing the pressure of gas emanating from the products in the treater as a means for regulating the rate of water flow from the treater to the salt pits and thereby maintaining predetermined levels of water in the treater itself.

It is an important aim of the present invention to provide structure for handling petroleum products that includes novel parts responsive to the rise and fall of water level in the treater for directing more or less gas to a water overflow conduit forming a part of the water siphoning means, so as to increase or decrease the rate of water flow and thereby maintain predetermined water levels in the treater, notwithstanding the changes in the percentage of water in the petroleum products flowing into the treater.

A still further object of this invention is to provide a treater having structure for overcoming preesntly existing problems relative to freezing of the water that is removed from the oil as the same flows into the salt pits.

It is an important aim of this invention to utilize the aforementioned gas pressure in the water overflow conduit of the water siphoning system to hold the water level in such conduit below the surface of the ground at all times, whereby to avoid freezing of the water in the conduit when the treater is placed in use in cold climates or during freezing weather.

In the drawings:

Figure 1a is a side elevational view of the uppermost portion of an emulsion treater having water control system made pursuant to the present invention, parts being broken away and in section to reveal details of construction; and Fig. 1b is a view similar to Fig. 1a, showing the lowermost portion of the treater.

An elongated, vertical drum broadly designated by the numeral 10 is provided with a horizontal partition 12 intermediate the ends thereof, presenting a heating compartment 14 below the partition 12 and a settling compartment 16 above partition 12. A hollow tank 18 mounted on the drum 10 at the uppermost end theerof receives the petroleum products 20 to be treated, by means of ail oil inlet 22. The products 20 establish a normal level 24 in the tank 18, which level will rise and fall, as will hereinafter be clear. The products 20 are drained from the tank 18 by tubular means 26 depending from the tank 18 and disposed in the drum 10, tubular means 26 extending through the partition 12 and terminating within the heating compartment 14 above the bottom of the latter. It may be pointed out that by such construction the petroleum products 20 are preheated prior to being subjected to heat provided by a furnace 28 in the compartment 14.

A furnace 28 mounted in the wall of compartment 14 and having a flue 29 and air inlet 31 disposed exteriorly of tank 10 extends into heating chamber 30 formed in the compartment 14 by means of a U-shaped shield 32 of heat conductible material having the legs 34 and 36 thereof which depend from its bight 38 terminating above the bottom of compartment 14. The shield 32 extends entirely across the compartment 14, to the end that all of the petroleum products 20 must traverse and wash against the furnace 28 before the same can flow to passage means 40 passing through bight 38 and partition 12. Much of the free water content of the petroleum products 20 will immediately settle in the compartment 14 as the same emanate from the lower end of tubular means 26, but substantially all of the remainder of the products 20 will be forced to circulate upwardly along the leg 36, thence over the bight 38 and finally downwardly along the leg 34 before entering the direct heating chamber 30. The lowermost end of the leg 34 is higher than the lower end of leg 36, so that the emulsion 20 will flow beneath the leg 34 when inlet openings 42 are unable to handle the flow.

The emulsion that passes through the openings 42 is distributed in the heating chamber 30 by means of a hollow, funnel-shaped diffuser 44. The forced circulation of the products exteriorly of the shield 32 preheats the same and thus additional water is settled therefrom even before it enters the chamber 30. Finally, during heating in chamber 30 and passage through and around the furnace 28, more water will be separated and settled into the chamber 14. The remaining products will rise through the passage means 40 into the settling compartment 16, and here again more water is settled out above the partition 12, particularly as the products are caused to flow upwardly through filter medium 46. A water overflow downcomer 47 has its uppermost end within the water that settles in compartment 16 and passes downwardly through the partition 12 alongside the leg 36 of shield 32, through which it passes at its lowermost end adjacent the bottom of the leg 36, for the purpose of conveying water from the compartment 16 into the heating chamber 30.

A heat exchanger 48 exteriorly of the drum 10 includes a water overflow conduit 50, a water tube 52 in surrounding spaced relationship to conduit 50, and an outermost oil overflow pipe 54, the tubular, coaxial passages 50, 52 and 54 having their axes disposed vertically. An oil conduit 56 interconnects the drum 10 slightly below the upper end of compartment 16 and the oil overflow pipe 54 adjacent the top of the latter. A water conduit 58 joins the water tube 52 and the compartment 14 substantially in alignment with the lower end of leg 34. A plurality of ports 60 in the water overflow conduit 50 adjacent the upper end of water tube 52 receive water from tube 52 for flow into the conduit 50.

A gas tube 62 extends downwardly through the bottom of tank 18, through the filtering medium 46, and through the partition 12, terminating at its lowermost end, as shown in Fig. 1b, above the normal level of oil in the compartment 14, which level is designated by the numeral 64. It is noted in Fig. 1a that the upper end of tube 62 is above the normal level 24 of the products 20 in tank 18. Through the medium of the gas tube 62, the pressure in tank 18 below gas and oil separator 66 is normally the same as the pressure in compartment 14. Pressure relief means for evacuating tank 18 of gas emanating from the products in tank 18 and in compartment 14 includes outlet means 68 provided with a valve (not shown) that is controlled by a float 70 buoyantly supported in the products 20 within the tank 18.

The pressure in the separator 66 of tank 18 is equalized with that of the settling compartment 16 by an interconnecting gas passageway 72 that has a branch 74 connecting with a control receiver 76 carried by the drum 10. A tubular riser 78 in the compartment 16, having its lowermost end below the normal water level 80 of compartment 16 and above the partition 12, depends from the receiver 76. Water level 82 in the riser 78 below the oil level 84 in the compartment 16 will rise and fall, as will hereinafter be made clear, and the water in riser 78 supports a quantity of oil 86 placed in the receiver 76 by way of fill cap 88.

A gas pipe 90 extending into the receiver 76 connects with the water overflow conduit 50 at the uppermost end of the latter. Pipe 90 has a valve 92 therein that is controlled by a float 94 buoyantly supported in the oil 86. A gas by-pass 96 connecting with the gas pipe 90 above heat exchanger 48 evacuates gas to the atmosphere and is provided with a by-pass valve 98 that is preferably of an adjustable nature, for purposes to be made clear.

Clean oil is conveyed to the stock tanks by means of an oil tube 100 that connects with the oil overflow pipe 54 and is provided with a control valve 102. Valve 102 is in turn controlled by the head of water in water tube 52 through the medium of a water branch 104 connected with tube 52 and with a housing 106 on one side of a diaphragm in the latter operably coupled with the valve 102. Such head of water in tube 52 acting upon the diaphragm in housing 106 and tending to close the valve 102 is overcome by the combined action of the head of oil in the oil overflow pipe 54 and a preselected weight 108 operably connected with the valve 102.

The water overflow conduit 50 passes beneath the surface of the ground, as shown in Fig. 1b, and connects with a container 110 buried in the ground by a vertical pipe 112. The container 110 is also placed in communication with the conduit 50 by a gas conduit 114 in opposed relationship to the water pipe 112. A gas outlet 116 for the container 110 has a valve 118 therein that is controlled by a float 120 buoyantly supported by the water in container 110.

Predetermined water levels 80 in compartment 16 and 122 in compartment 14 are maintained through the construction above set forth, and the warm gas emanating from the products 20 is also utilized to avoid freezing of the water being conveyed to the salt pits through employment of the container 110 and its associated parts by directing the gas into the same. It is appreciated at the outset that by virtue of the disposition of oil conduit 56 near the top of the drum 10, the oil level 84 will normally be sufficiently high to raise the water in the riser 78 to a point below the level 84 and to raise the water in the tube 52 to a point below level 84 where it will overflow into the conduit 50 by way of ports 60. It is to be understood that consideration must be given to the fact tha the drum contains both water and oil which are incapable of raising the level in tube 52 that contains water as high as the level 84.

In accordance with the present invention, it is recognized further that the rate of flow of the water from water tube 52 into the water overflow conduit 50 must vary in accordance with the ratio of water to oil in the incoming products 20 if the levels 80 and 122 are to be maintained at a predetermined height. Accordingly, as the water level 80 rises to produce a resulting rise in the water level 82, the oil 86 will raise the float 94 to open the valve 92 and thereby permit passage of gas from the receiver 76 to the tube 50 via gas pipe 90. The descending gas in the conduit 50, acting on the overflowing water and tending to create a suction in the water tube 52, increases the rate of water flow from the tube 52 to the conduit 50. As the water level 80 falls to a predetermined height in compartment 16, valve 92 will progressively close and the rate of water flow through ports 60 will be gradually reduced. With the closing of valve 92, the flow of gas from receiver 76 and compartment 16 to conduit 50 is cut off.

The different pressures in the two portions of tank 18, i. e. that in separator 66 and that which exists below the separator 66, produce a differential in pressures above the oil levels 64 and 94, respectively, and this factor operates further to assure delivery of the oil to the stock tanks, regardless of the pressure requirements that are necessary to so move the oil from the treater to the stock tanks. If the oil level 84 rises in the compartment 16 above a predetermined level, with a consequent fall in the level 24 of tank 18, the valve that is controlled by float 70 will open, increasing the pressure above the oil level 84 and increasing the rate of oil flow by way of conduit 56, oil overflow pipe 54 and oil tube 100.

As mentioned above, the normal flow of gas descending into conduit 50 is to atmosphere. When valve 92 in receiver 76 is opened by the rise of water level 80 in compartment 16, gas flows from receiver 76 to conduit 50, and thence to atmosphere through the gas outlet 116 associated with container 110. Valve 98 opens only when there is a sudden build up of pressure within conduit 50, for example, when the valve 118 is closed at the time valve 92 opens. Valve 98 may be adjusted to close at whatever pressure is required to maintain the desired level in container 110.

All of the normal operating pressures are controlled, therefore, by a predetermined setting of the valve 98 which relieves the pressure to atmosphere by way of the gas by-pass 96. Through use of the control valve 98, it is also possible in the treater hereof to keep the water level in the water overflow conduit 50 below the level of the ground. A water level is established, as shown in Fig. 1b, in the container 110 coincident with the water level in conduit 50, by virtue of the provision of pipe 112. If such levels rise, the valve 118, as controlled by float 120, will gradually close and eventually prevent the escape of gas in the container 110, conduit 114, and conduit 50 to atmosphere, by way of outlet 116.

In this manner, the treating system of the present invention is, in fact, responsive to variations in the ratio of water to oil in the incoming products. As this ratio increases, the frequency of operation of valve 92 and, consequently, the quantity of settled water discharged also increases. Simultaneously, the gas exhausted from receiver 76 and compartment 16 and flowing in conduit 50 insures rapid discharge of settled water from container 110 under the increased flow conditions.

As the pressure increases in the conduit 50 because of the closure of outlet 116, the rate of flow of the water in the conduit 50 to the salt pits will increase until the float 120 opens the valve 118 and thereby permits the escape of gas from the conduit 50 and the container 110 through the outlet 116. The treater hereof may thereby be used in all localities, regardless of weather conditions, since the problem of freezing of the removed water as it flows to the salt pits is fully eliminated.

Having thus described the invention, what is claimed as new and desired to be secured by Letters Patent is:

1. In structure for handling petroleum products containing oil, water and gas, a vertical drum having a horizontal partition presenting a heating compartment below the partition and a settling compartment above the partition; tubular means connected with the heating compartment for directing said products thereinto; passage means connecting the compartments for flow of said products from the heating compartment to the settling compartment; an oil overflow pipe connected with the settling compartment for draining oil therefrom; a water overflow downcomer connecting the compartments for flow of water settled in the settling compartment to the heating compartment; a water tube connected with the heating compartment for receiving water settled in the latter; a water overflow conduit connected with said water tube and disposed to receive water from the water tube under influence of the head of said products in the drum; a tubular riser disposed to receive settled water in the settling compartment; and means responsive to rise and fall of the water level in said tubular riser for directing gas under pressure emanating from said products into said water overflow conduit to increase the rate of flow of water from the water tube to the water overflow conduit and thereby maintain the settled water in the compartments at a predetermined level.

2. In structure for handling petroleum products containing oil, water and gas, a vertical drum having a horizontal partition presenting a heating compartment below the partition and a settling compartment above the partition; tubular means connected with the heating compartment for directing said products thereinto; passage means connecting the compartments for flow of said products from the heating compartment to the settling compartment; an oil overflow pipe connected with the settling compartment for draining oil therefrom; a water overflow downcomer connecting the compartments for flow of water settled in the settling compartment to the heating compartment; a water tube connected with the heating compartment for receiving water settled in the latter; a water overflow conduit connected with said water tube and disposed to receive water from the water tube under influence of the head of said products in the drum; a tubular riser disposed to receive settled water in the settling compartment; a gas pipe connected with the water overflow conduit; a receiver for gas emanating from said products, said receiver interconnecting the gas pipe and the tubular riser; and means responsive to rise and fall of the water level in said tubular riser for directing gas under pressure from the receiver into the gas pipe and thence into said water overflow conduit to vary the rate of flow of water from the water tube to the water overflow conduit and thereby maintain the settled water in the compartments at a predetermined level.

3. In structure as set forth in claim 2, wherein said receiver is adapted to contain a quantity of oil supported by the level of water in the tubular riser and wherein said last-mentioned means includes a normally closed valve in the gas pipe, and a float control for the valve supported buoyantly by the oil in the receiver.

4. In structure as set forth in claim 3, wherein is provided a gas passageway connected with the receiver and with the settling compartment above the levels of oil thereof for directing gas thereinto and maintaining equal pressures therein.

5. In structure for handling petroleum products containing oil, water and gas, a vertical drum having a horizontal partition presenting a heating compartment below the partition and a settling compartment above the partition; a tank for receiving said products, said tank having outlet means for gas emanating from the products; tubular means in the drum, depending from said tank and extending through the partition for directing said products into the heating compartment; passage means connecting the compartments for flow of said products from the heating compartment to the settling compartment; an oil overflow pipe connected with the settling compartment for draining oil therefrom; a water overflow downcomer connecting the compartments for flow of water settled in the settling compartment ot the heating compartment; a water tube connected with the heating compartment for receiving water settled in the latter; a water overflow conduit connected with said water tube and disposed to receive water from the water tube under influence of the head of said products in the drum; a gas tube connecting the tank with the heating compartment above the level of oil in the latter for maintaining equal pressures in the tank and the heating compartment; pressure relief means in said outlet means responsive to rise and fall of the level of said products in the tank for controlling flow of gas under pressure from the tank; a gas passageway for conveying the gas from said outlet means to the settling tank above the level of oil in the latter; and means responsive to a rise of water in the settling compartment for directing said gas from the gas passageway into said water overflow conduit to vary the rate of flow of water from the water tube to the water overflow conduit and thereby maintain the settled water in the compartments at a predetermined level.

6. In structure for handling petroleum products containing oil, water and gas, a vertical drum having a horizontal partition presenting a heating compartment below the partition; tubular means connected with the heating compartment for directing said products thereinto; passage means connecting the compartments for flow of said products from the heating compartment to the settling compartment; a water overflow downcomer connecting the compartments for flow of water settled in the settling compartment; a vertical oil overflow pipe connected with the settling compartment for draining oil therefrom; a water tube within said pipe, the lower end of which communicates with the heating compartment for removing water therefrom; a water overflow conduit passing through said tube and having the lowermost end thereof in communication with said tube adjacent the uppermost end of the latter for receiving water from said tube under influence of the head of said products in the drum; a gas passageway in communication with said drum and connected to the uppermost end of said conduit; and means responsive to the rise of water in the settling compartment for directing gas emanating from said products to said passageway to increase the rate of flow of water from the water tube to the water overflow conduit and thereby maintain the settled water in the compartments at a predetermined level.

7. In structure as set forth in claim 6, wherein is provided means connected to said water overflow conduit and responsive to rise and fall of the water level therein for controlling the flow of gas from the water overflow conduit to the atmosphere.

8. In structure as set forth in claim 7, wherein said last-mentioned means includes a container below the drum, a gas conduit connecting the water overflow conduit and the container, a water pipe connecting the container and the water overflow conduit, and a valve having a float control in the container for regulating the escape of gas from the container to the atmosphere.

References Cited in the file of this patent

UNITED STATES PATENTS

| | | |
|---|---|---|
| 2,025,883 | Mobley | Dec. 31, 1935 |
| 2,420,115 | Walker et al. | May 6, 1947 |
| 2,546,269 | Lovelady | Mar. 27, 1951 |
| 2,609,099 | Griswold | Sept. 2, 1952 |
| 2,610,698 | Lovelady | Sept. 16, 1952 |
| 2,619,187 | Hayes et al. | Nov. 25, 1952 |